No. 897,316. PATENTED SEPT. 1, 1908.
J. K. STEWART.
SWIVEL JOINTED SHAFT.
APPLICATION FILED NOV. 1, 1907.

Witnesses,
Edward T. Wray.
M. Gertrude Ady.

Inventor.
John K. Stewart.
by Burton & Burton
his Attys.

UNITED STATES PATENT OFFICE.

JOHN K. STEWART, OF CHICAGO, ILLINOIS.

SWIVEL-JOINTED SHAFT.

No. 897,316.　　　Specification of Letters Patent.　　　Patented Sept. 1, 1908.

Application filed November 1, 1907. Serial No. 400,1.

*To all whom it may concern:*

Be it known that I, JOHN K. STEWART, a citizen of the United States, residing at Chicago, in the county of Cook and State of Illinois, have invented new and useful Improvements in Swivel-Jointed Shafts, of which the following is a specification, reference being had to the drawings forming a part thereof.

The purpose of this invention is to provide an improved joint in a power-transmitting device for transmitting power from a driving shaft to a driven shaft whose direction with respect to the driving shaft is variable, and to provide such structure in desirable form for performing this service in transmitting power from the wheel of the vehicle to an indicating or registering mechanism mounted on the vehicle body for indicating the speed or distance traveled.

The invention consists in the elements and features of construction and the combination shown and described, as indicated in the claims.

Figure 1:
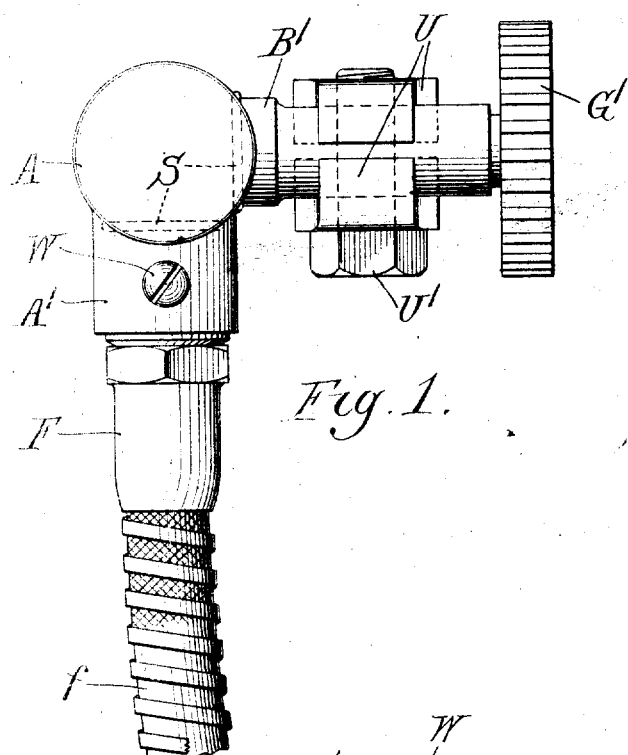
Figure 3:
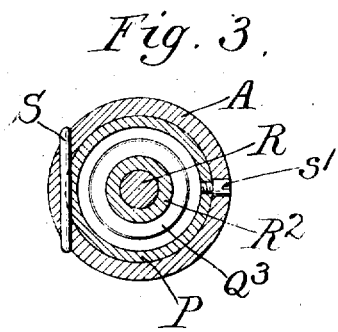
Figure 2:
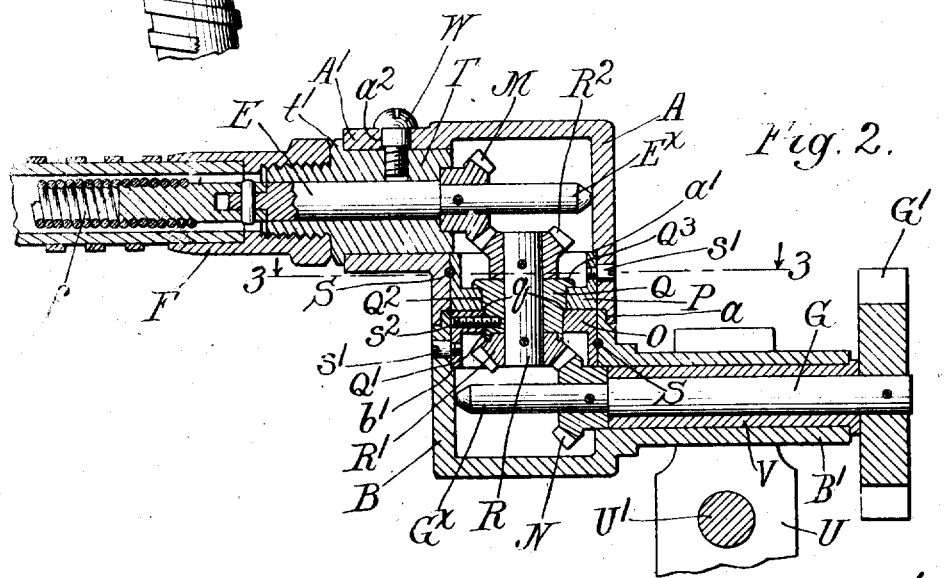

In the drawings:—Figure 1 is a plan view of a device embodying this invention. Fig. 2 is an axial section through all the shafts of the device. Fig. 3 is a detail section at the line 3—3 on Fig. 2.

This joint comprises a two-part case, the two parts, A and B, each comprising one-half of a hollow cylinder, which are preferably rabbeted together at their junction, as shown at *a*, for swiveling one upon the other about the axis of such cylinder. The outer end of each half cylinder is closed. Each of the parts, A and B, beside the cylindrical main body portion described, has a hollow arm projecting at right angles to the axis of said cylindrical portion, said arms, A¹ and B¹, being designed respectively to support bearings for driving and driven shaft elements transverse to the axis of the two-part swiveled cylindrical elements. Within the bearing arm, A¹, there is journaled a driven shaft element, E, which projects from the end of said arm for connection with the device to be operated,—as, for example, a speedometer (not shown),—by any power-transmitting means, as the flexible shaft, *f*, the terminal element, F, of whose casing of familiar construction is shown attached to said arm, A¹ (by means hereinafter described).

Within the bearing arm, B¹, of the element, B, there is journaled a driving shaft, G, which protrudes from the end of said arm and is adapted for operative connection to a wheel, as the pinion, G¹, which is provided for meshing with a gear or gear rim (not shown) on the wheel whose speed or distance of travel is to be measured. The shafts, E and G, have on their inner ends respectively within the cylindrical elements, A and B, bevel-gears, M and N; and for communicating rotary motion from one of said bevel-gears to the other, and also connecting together, with capacity for swiveling, the two cylindrical elements, A and B, there is provided the structure which will now be described. This connecting and power-transmitting structure comprises, first, for the purpose of connecting the two cylindrical elements, A and B, with capacity for swiveling, a steel diaphragm bushing, O, which is made fast in one of the cylindrical elements to be connected, and a generally similar but slightly different style of diaphragm bushing, P, made fast in the other of said two cylindrical elements. These two diaphragm bushings, however, are not primarily made fast nor inserted in the cylindrical elements respectively, but are first connected together by a coupling sleeve, Q, which has a very slightly tapered portion, Q¹, extending for a distance from one end, and a cylindrical portion Q², extending from said tapered portion a distance equal to the thickness of the diaphragm, P, said cylindrical portion being terminated at a shoulder formed by a flange, Q³, which terminates the said sleeve. The diaphragm, O, is provided with a central aperture tapered to receive the tapered end portion, Q¹, of the sleeve, Q, the aperture being of such diameter relatively to the said tapered portion that the latter may, by sufficient pressure, be forced thereinto up to a slight shoulder, *q*, which preferably marks the limit of the tapered portion and the commencement of the cylindrical portion of the sleeve, the intention being that when thus forced together the sleeve, Q, and diaphragm bushing, O, will be practically inseparable by any force which can be applied in the use of the device. The diaphragm bushing, P, has a central cylindrical aperture adapting it to be journaled loosely enough for rotation upon the cylindrical portion, Q², of the sleeve, the length of such cylindrical portion being such that the said diaphragm is stopped loosely enough for rotation between the diaphragm, O, and the flange, Q³. The three parts,—to wit, the two diaphragm bushings and the sleeve,—being thus assembled, it will be seen that there is formed a swivel joint between the two bushings which can thus rotate relatively to each other about their common axis, which is the axis also of the sleeve. The sleeve is axially apertured cylindrically, and affords thereby bearing for the shaft, R, of the bevel-gear, R¹, which is adapted to mesh with one of the bevel-gears, M or N,—it is a matter of indifference which,—the parts being adapted to be assembled for either engagement. The shaft, R, being inserted through the bushing, there is pinned fast upon its end which protrudes at the other side of the bushing a similar bevel gear, R², adapted to mesh with the other of the two gears, M and N.

The swivel joint device comprises, it will be seen, the two diaphragm bushings, O and P, with the connecting sleeve, Q; and the entire structure comprising such swivel joint device, the two gears, R¹ and R², with their connecting shaft, R, and the two members, A and B, having mounted on their respective arms, A¹ and B¹, the driving and driven shafts, E and G, with their bevel-gears, M and N, is assembled permanently by forcing the two bushing diaphragms into the open ends of the two cylindrical elements, A and B, until they are stopped by the shoulders, a¹ and b¹, formed by properly counterboring the open ends of the said cylindrical elements, said shoulders being at proper distance back from said open ends respectively to thus stop the bushings when the gears are properly intermeshed and the rabbeted margins of the two cylindrical members are suitably entered one within the other, as shown in Fig. 2. Preferably the bushings, O, P, are of such diameter with respect to the counterbored open ends of the cylindrical elements into which they are to be forced that being once driven into their seats in said elements down to the shoulders mentioned, they are inseparable by any force to which the device can be exposed in performing the service for which it is designed; but if for any purpose or in any situation it is considered desirable to make further provision against the separation of parts, each bushing may be pinned into the cylindrical element to which it belongs, by any convenient means, as by the tangential pins, S, S; or, either alone or in addition to such tangential pins, by radial pins, S¹, S¹. When the latter are employed they are preferably threaded at their inner end, the apertures in the bushing to receive them being tapped, the outer end portion which extends through the cylindrical shell being smooth, and the pin being screwed down to the shoulder in the steel bushing, so that it is secure. This construction is preferable, especially in view of the fact that the shells or casings, A and B, are preferably made of metal which can be cast in steel dies, and so made very cheaply, and which would not afford so reliable an engagement for a set screw or other form of fastening engaging a thread in such relatively soft material.

Although it is generally satisfactory and usually preferred, to unite the sleeve, Q, to the bushing having the tapered aperture, by the frictional engagement which may be effected by driving the tapered end of the sleeve into the tapered aperture, yet whenever for any reason it is preferred not to rely upon this form of engagement, even though the taper may be employed, the two parts may be connected by a pin S², taking radially through the bushing and into the sleeve. This pin may be threaded and screwed into the parts which it connects, but the threaded form is desirable only for the convenience of withdrawing it, because it will be retained against any possibility of escaping when the diaphragm bushing is driven into its seat in the casing, as will be clearly understood from Fig. 3. And it will be understood that, in practice, for the usual purposes for which the device is intended, not only are the diaphragm, O, and sleeve, Q, retained in connection by their frictional engagement at their respective tapered seats, but also both the diaphragm bushings, O and P, are retained in the respective members of the casing by frictional engagement, which may be made sufficiently secure even without tapering.

It will be observed that in order to provide for properly assembling the parts of this device with the gears properly intermeshed there will be a distinct advantage in being able to secure either of the gears, M and N, to the ends of their respective shafts before the shafts and gears thereon are introduced into the casing. It will also be observed that since the shafts, E and G, are necessarily stopped endwise in one direction by the ends of the hubs of the gears, M and N, it is important to provide smooth shoulders or counterbores about the bearings of said shafts for the hubs to stop against, and that the making of such smooth shoulders in the interior of the cylindrical shell would involve some practical difficulty.

The requirements of convenience above indicated are met and the difficulties indicated are avoided by the construction adopted and shown in the drawings in respect to the bearing of the shaft, E, in which a steel bushing, T, is provided in the arm, A¹, the outer diameter of such steel bushing being substantially equal to the extreme outer diameter of the pinion, M, to the outer points of its width, so that the pinion can be entered through any bore adapted to receive the bushing. The sleeve or arm, A¹, has its axial cavity cylindrical, the diameter of such cavity being such as to receive the sleeve, T, said sleeve being bored axially to afford bearing for the shaft, E, and counterbored to afford a finished stop shoulder for the hub of the gear, M, which is secured fast to the end of the shaft, E, before being inserted in the bushing, the bushing carrying the shaft and gear being then inserted into the arm, A¹, to the proper depth for meshing of the gears, the bushing being preferably provided with a shoulder, t¹, stopping it on the end of the arm, A¹, at the proper depth for such meshing. Any convenient means may be employed to secure the bushing in the arm, A¹—that is, to prevent its withdrawing. Preferably, in view of the intended employment of relatively soft metal for the casing, I employ a threaded pin, W, taking through lateral apertures, a², in the arm, A¹, and screwed into the bushing which is bored and tapped at the right point for that purpose.

When employing a casing made in the manner described and of the character of metal which can be thus made,—that is to say, by being forced into a steel die or mold,—a steel lining or bushing is desirable, even when it is not considered important to provide it for the purpose of introducing the gear on its spindle as described and shown in the case of the arm, A¹. To meet this necessity and provide a bushing of proper material to furnish bearing for the shaft, a steel bushing, V, is driven into the arm, B¹, of the shell, affording by its end a finished shoulder to stop the hub of the bevel gear, N, which is pinned to the shaft after the latter is inserted through the bushing, V, and before the bushing, O, is inserted in the open end of the cylindrical body. The application of the same mode of construction to the bearing of the shaft, G, is obvious. The arm, B¹, is shown longer and of less diameter than the arm, A¹, and of less diameter than would be necessary to permit the withdrawal of the gear through it, and the employment for that purpose of a suitably large bushing, the advantage of that construction being sacrificed in order to adapt the arm, B¹, to be held in a clamp, U, provided with a clamping bolt, U¹, so that the whole fitting may be adjustable longitudinally and about the axis of the gear, G¹, and so that an excessively large clamp may be avoided and a reasonably long bearing therein afforded.

It will be observed that while the bushings or sleeve linings, V and T, stop the bevel gears, M and N, against outward movement, there is nothing to stop them against too deeply meshing with the gears, R¹ and R², except the devices which may be connected to the outer ends of the shafts respectively,—as, for example, the gear, G¹, on the shaft, G; and in the construction shown, the flexible shaft attached to the shaft, E, does not afford such stop. I prefer, therefore, to provide the shafts, E and G, at their inner ends, with extended terminals, E² and G², respectively, projecting across the cavity of the cylindrical members, A and B, and stopped against the opposite wall, as seen in Fig. 3.

I claim:—

1. In a device for the purpose indicated, a case comprising two members having each an open end and assembled with their open ends seating one upon the other for rotation about an axis at right angles to their meeting plane, and a device for connecting said two members for such rotation consisting of two annular diaphragms formed separately from said members and inserted and secured in the proximate ends of said members respectively, and a coupling sleeve extending through said annular diaphragms, longitudinally stopped with respect thereto and loose for rotation in one of them.

2. In a device for the purpose indicated, a case comprising two members having each a closed end and an open end and assembled with their open ends seating one upon the other for rotation about an axis at right angles to their meeting plane; a device for connecting said two members for such rotation consisting of an annular diaphragm inserted and secured in the open end of each member and formed separately therefrom for such insertion and securement, and a coupling sleeve extending loose through one diaphragm, longitudinally stopped thereon at the inner side thereof and made fast in the other diaphragm.

3. In a device for the purpose indicated, a gear casing comprising two members which have each a closed and an open end and which are assembled with their open ends facing; a device for connecting said two members with capacity for relative rotation about an axis at right angles to their meeting plane, consisting of two annular diaphragms formed separately from said members respectively, and inserted and made fast in the proximate ends of said respective members, and a sleeve which connects them rotatably about the axis thereof.

4. In a device for the purpose indicated, a gear case comprising two members assembled end to end with capacity for rotation about an axis at right angles to their meeting plane and having their opposite ends closed; a device for connecting said two members for such rotation consisting of diaphragms for closing their meeting ends; a sleeve which connects said diaphragms rotatably about the axis of the sleeve, said members being interiorly shouldered to stop the diaphragms respectively, the diaphragms being adapted to be forced tight into the sleeves to the shoulders and to retain the two members together by their frictional engagement with said members respectively.

5. In a device for the purpose indicated, a case comprising two members having each a closed end and an open end, and assembled with their open ends seating one upon the other for rotation about an axis at right angles to their meeting plane; a device for connecting said two members for such rotation consisting of two diaphragms adapted to be driven tight into the ends of said members respectively, and axially apertured and provided with a swivel connection about such axial apertures.

6. In a device for the purpose indicated, a case comprising two members having each an open end and seated one upon the other at their said open ends, each member having a transverse shaft bearing, and a shaft journaled therein provided with a gear at its inner end within the case member, in combination with a device for connecting said case members with capacity for relative rotation about an axis at right angles to their meeting plane and transmitting rotation from one of said shafts to the other, consisting of two annular diaphragms formed separately from said case members respectively, and adapted to be inserted and secured in the open ends of said respective members; a sleeve which connects said diaphragms rotatable about their axis; a shaft extending axially through the sleeve and journaled therein, and gears on the sleeves at opposite sides of the diaphragms adapted to mesh respectively with the first mentioned gears.

7. In a device for the purpose indicated, a case comprising two members having transverse shaft bearings and having each one closed and one open end, said members being adapted for seating one upon the other at their open ends; a device for connecting said case members with capacity for relative rotation about an axis at right angles to their meeting plane comprising axially apertured diaphragms adapted to be forced tight into the open ends of the members respectively, and a coupling sleeve connecting said diaphragms having a cylindrical portion adapted to be journaled loose for rotation in one of the diaphragms, and provided with an end flange stopped thereon, the other end of the sleeve being slightly tapered for driving tight into the axial aperture of the other diaphragm, said aperture being similarly tapered, the sleeve being provided with a stop shoulder to limit its insertion into said tapered aperture of the diaphragm.

In testimony whereof, I have hereunto set my hand at Chicago, Illinois, this 30th day of October, 1907.

JOHN K. STEWART.

Witnesses:
CHAS. S. BURTON,
J. S. ABBOTT.